PRINTED SPECIFICATION AVAILABLE.
V. Battin.
Coal Breaker.
BEST AVAILABLE COPY
No 67.
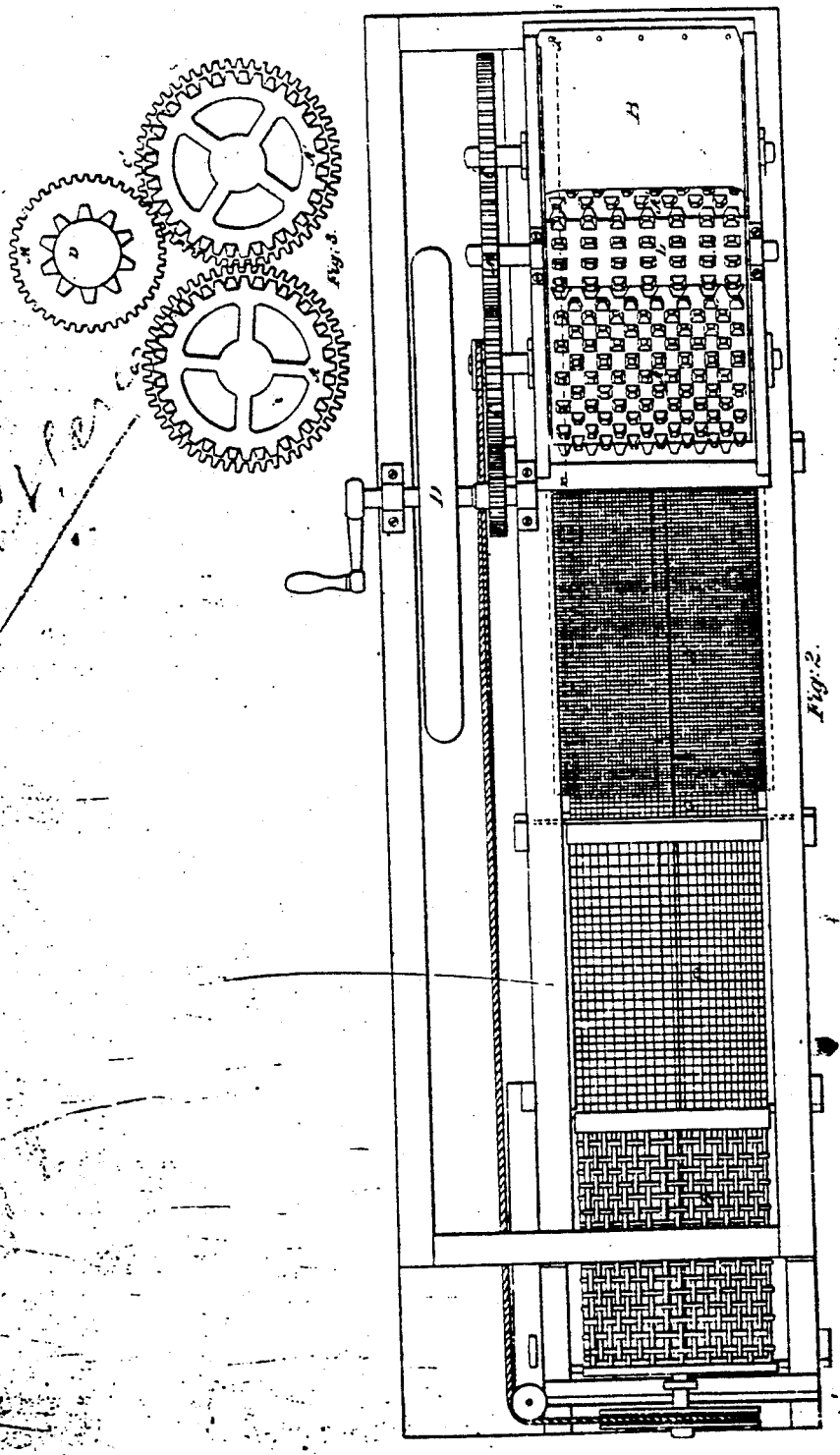
A.L. Patented Jan. 20, 1844.